(12) United States Patent
Chiba et al.

(10) Patent No.: US 9,766,800 B2
(45) Date of Patent: Sep. 19, 2017

(54) ELECTRONIC DEVICE, CONTROL METHOD, AND CONTROL PROGRAM

(71) Applicant: KYOCERA Corporation, Kyoto-shi, Kyoto (JP)

(72) Inventors: Atsuo Chiba, Yokohama (JP); Hideko Murakami, Yokohama (JP); Hisae Honma, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/720,443

(22) Filed: May 22, 2015

(65) Prior Publication Data
US 2015/0253955 A1 Sep. 10, 2015

Related U.S. Application Data

(63) Continuation-in-part of application No. PCT/JP2013/081442, filed on Nov. 21, 2013.

(30) Foreign Application Priority Data

Nov. 22, 2012 (JP) .................. 2012-256223

(51) Int. Cl.
*G06F 3/041* (2006.01)
*G06F 3/0488* (2013.01)
(Continued)

(52) U.S. Cl.
CPC ........... *G06F 3/0488* (2013.01); *G06F 3/041* (2013.01); *G06F 3/0485* (2013.01);
(Continued)

(58) Field of Classification Search
CPC .............. G06F 3/0488; G06F 3/04845; G06F 3/04817; G06F 3/041; G06F 3/04883;
(Continued)

(56) References Cited

U.S. PATENT DOCUMENTS

2008/0220752 A1* 9/2008 Forstall .................. H04M 1/56
455/415
2011/0063491 A1* 3/2011 Kim ........................ G06F 3/005
348/333.01
(Continued)

FOREIGN PATENT DOCUMENTS

| JP | 9-161088 A | 6/1997 |
| WO | 2008/086302 A1 | 7/2008 |
| WO | 2012/147521 A1 | 11/2012 |

OTHER PUBLICATIONS

International Search Report mailed Feb. 10, 2014 in corresponding International Application No. PCT/JP2013/081442.
(Continued)

*Primary Examiner* — Md Saiful A Siddiqui
(74) *Attorney, Agent, or Firm* — Hauptman Ham, LLP

(57) ABSTRACT

According to one of aspects, an electronic device includes a touch screen display and a controller. The touch screen display is configured to display a screen. The touch screen display is configured to detect an operation. The controller is configured to display the screen, reduce the screen according to an operation detected through the touch screen display, and display a reduced screen.

4 Claims, 9 Drawing Sheets

(51) Int. Cl.
*G06F 3/0481* (2013.01)
*G06F 3/0484* (2013.01)
*G06F 3/0485* (2013.01)

(52) U.S. Cl.
CPC ...... *G06F 3/04817* (2013.01); *G06F 3/04845* (2013.01); *G06F 3/04883* (2013.01); *G06F 3/04886* (2013.01); *G06F 2203/04806* (2013.01)

(58) Field of Classification Search
CPC .............. G06F 3/04886; G06F 3/0485; G06F 2203/04806; G06F 3/044
See application file for complete search history.

(56) References Cited

U.S. PATENT DOCUMENTS

| | | | | |
|---|---|---|---|---|
| 2012/0017176 A1* | 1/2012 | Choi | .................... | G06F 3/0482 715/825 |
| 2013/0285933 A1* | 10/2013 | Sim | .................... | G06F 3/04883 345/173 |
| 2014/0049678 A1* | 2/2014 | Tanaka | .............. | H04M 1/72522 348/333.01 |

OTHER PUBLICATIONS

"Full of Information on Reinforced Map Application and Tips on Smart Use of the Application", Chapter 2, iPhone People, pp. 12-23, Oct. 29, 2012, Ascii Media Works, Tokyo, Japan, for which partial translation in English is attached.

Office Action in JP Application No. 2012-256223, mailed Dec. 6, 2016, for which an explanation of relevance is attached.

* cited by examiner

| ASSIST ICON | CORRESPONDING ACTION |
|---|---|
| B1 | Memory Release |
| B2 | Display of Notification Screen |
| B3 | Return to Previous One (Go back to beginning) |
| B4 | MENU DISPLAY |

ELECTRONIC DEVICE, CONTROL METHOD, AND CONTROL PROGRAM

CROSS-REFERENCE TO RELATED APPLICATION

This application is a Continuation-in-Part of PCT international application Ser. No. PCT/JP2013/081442 filed on Nov. 21, 2013 which designates the United States, incorporated herein by reference, and which is based upon and claims the benefit of priority from Japanese Patent Applications No. 2012-256223 filed on Nov. 22, 2012, the entire contents of which are incorporated herein by reference.

FIELD

The present application relates to an electronic device, a control method, and a control program.

BACKGROUND

A touch screen device with a touch screen has been known. Examples of the touch screen device include, but are not limited to, an electronic device such as a mobile phone, a smartphone, and a tablet. The touch screen device detects a gesture with a finger, a pen, or a stylus pen through the touch screen. The touch screen device operates according to the detected gesture. An example of the operation according to the detected gesture is described in, for example, Patent Literature 1.

The basic operation of the touch screen device is implemented by an OS (Operating System) built into the device. Examples of the OS built into the touch screen device include, but are not limited to, Android (registered trademark), BlackBerry (registered trademark) OS, iOS, Symbian (registered trademark) OS, and Windows (registered trademark) Phone.

The touch screen provided in the touch screen device allows easy single-handed operation.

CITATION LIST

Patent Literature

Patent Literature 1: International Publication No. WO 2008/086302

SUMMARY

According to one of aspects, an electronic device comprises: a touch screen display; and a controller configured to display a screen in the touch screen display, reduce the screen according to an operation detected through the touch screen display, and display a reduced screen.

According to one of aspects, a control method for controlling an electronic device with a touch screen display, the control method comprises: detecting an operation through the touch screen display; and displaying a screen displayed in the touch screen display in a reduced size according to the detected operation.

According to one of aspects, a non-transitory storage medium stores a control program for causing, when executed by an electronic device with a touch screen display, the electric device to execute: detecting an operation through the touch screen display; and displaying a screen displayed in the touch screen display in a reduced size according to the detected operation.

DESCRIPTION OF EMBODIMENTS

Exemplary embodiments for implementing the electronic device, the control method, and the control program according to the present application will be explained in detail below with reference to the accompanying drawings. In the following, a smartphone will be explained as one of examples of the electronic device.

Figure 1:
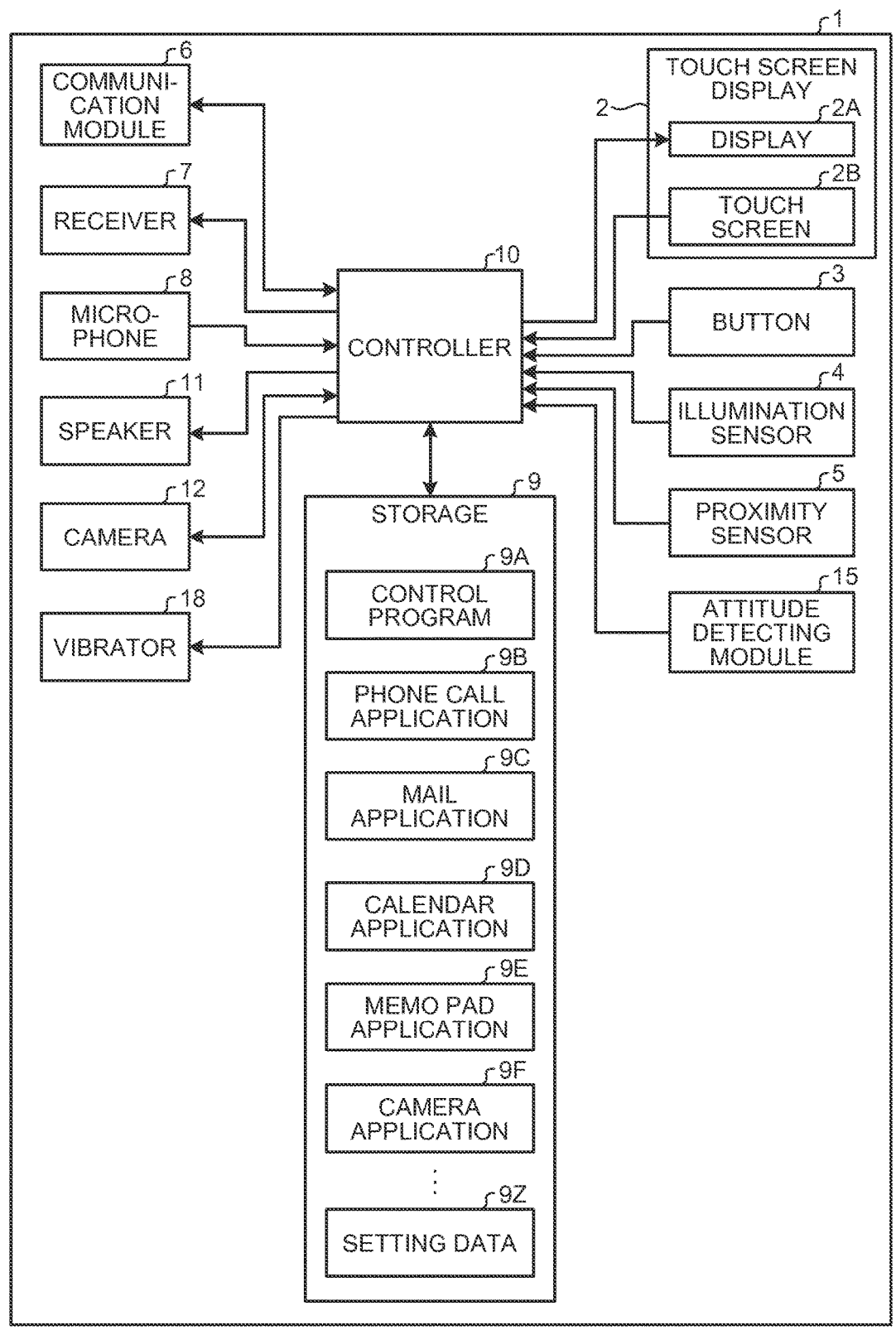
FIG. 1 is a block diagram of one of examples of a smartphone according to an embodiment.

A functional configuration of a smartphone 1 according to an embodiment will be explained with reference to FIG. 1. FIG. 1 is a block diagram of the smartphone according to an embodiment. In the following explanation, same reference signs may be assigned to similar components. Moreover, overlapping explanation may be omitted.

The smartphone 1 includes a touch screen display 2, a button 3, an illumination sensor 4, a proximity sensor 5, a communication module 6, a receiver 7, a microphone 8, a storage 9, a controller 10, a speaker 11, a camera 12, an attitude detecting module 15, and a vibrator 18.

The touch screen display 2 includes a display 2A and a touch screen 2B. The display 2A and the touch screen 2B may be arranged in an overlapping manner, or may be arranged side by side, or may be arranged apart from each other. When the display 2A and the touch screen 2B are arranged in an overlapping manner, for example, one or more sides of the display 2A does not have to be along any of the sides of the touch screen 2B. The touch screen display can realize some actions same as the display 2A and the touch screen 2B.

The display 2A includes a display device such as an LCD (Liquid Crystal Display), an OELD (Organic Electro-Luminescence Display), or an IELD (Inorganic Electro-Luminescence Display). The display 2A can display some objects. These objects include text, images, symbols, graphics, and the like. The display 2A can display a screen including some objects. The screen includes a lock screen, a home screen, and an application screen. The display 2A can display the application screen during running of an application. The home screen is sometimes called a desktop, a standby screen, an idle screen, a standard screen, an application list screen, or a launcher screen.

The touch screen 2B can detect a contact with itself. User contacts the touch screen 2B by a finger, some fingers, a pen, or the like (hereinafter, simply called "finger"). The touch screen 2B can detect a position where finger is in contact with the touch screen 2B. The touch screen 2B can notify the contact and the position to the controller 10.

The detection method of the touch screen 2B may be any one of a capacitive type detection method, a resistive type detection method, a surface acoustic wave type (or ultrasonic type) detection method, an infrared type detection method, an electromagnetic induction type detection method, and a load sensing type detection method. In the following explanation, for the sake of simplicity of the explanation, it is assumed that a user uses the finger to contact the touch screen 2B on order to operate the smartphone 1.

The smartphone 1 can realize some action same as controller 10. The controller 10 can determine a type of gestures based on at least one of a contact detected by the touch screen 2B, a position where the contact is detected, a change of the position, an interval between some contacts, and the number of times of the contacts. The gesture is an operation performed on the touch screen 2B using the finger. Examples of the gestures include, but are not limited to, touch, long touch, release, swipe, tap, double tap, long tap, drag, flick, curve drag, curve flick, pinch, and spread.

The button 3 can receive an input of user operation. The number of buttons 3 may be single or plural.

The illumination sensor 4 can sense illumination of the ambient light around the smartphone 1. The illumination indicates intensity, lightness, or luminance of light. The illumination sensor 4 may be used, for example, to adjust the luminance of the display 2A.

The proximity sensor 5 can sense the presence of nearby objects without any physical contact. The proximity sensor 5 may sense the presence of the objects based on a change in a magnetic field, a change in a return time of a reflected ultrasonic wave, or the like. The proximity sensor 5 may detect that, for example, the display 2A is brought close to someone's face. The illumination sensor 4 and the proximity sensor 5 may be configured as one sensor. The illumination sensor 4 may be used as the proximity sensor.

The communication module 6 can communicate with other device via a wireless system. A wireless communication standard supported by the communication module 6 includes, for example, a cellular-phone communication standard such as 2G, 3G, and 4G, and a short-distance wireless communication standard. The cellular-phone communication standard includes, for example, LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System). The short-distance wireless communication standard includes, for example, IEEE 802.11, Bluetooth (registered trademark), IrDA (Infrared Data Association), NFC (Near Field Communication), and WPAN (Wireless Personal Area Network). A WPAN communication standard includes, for example, ZigBee (registered trademark). The communication module 6 may support one or more of the communication standards.

The communication module 6 may receive a radio signal of a frequency band from a GPS satellite, perform demodulation processing on the received radio signal, and transmit the signal subjected to the processing to the controller 10. The smartphone 1 may be provided with a discrete communication module independent from the communication module 6 by separating the function of communication with the GPS satellite from the communication module 6.

The receiver 7 may be a sound output module. The receiver 7 can receive a sound signal from the controller 10 and output a sound signal as a sound. The receiver 7 may be used, for example, to output a voice of the other party during a call. The microphone 8 may be a sound input module. The microphone 8 can convert the voice of the user or the like to a sound signal and transmits the sound signal to the controller 10.

The storage 9 can store programs and data. The storage 9 may be used also as a work area for temporarily storing a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disc, or a magneto-optical disc with a reader of the storage medium. The storage 9 may include a storage device used as a temporary storage area such as RAM (Random Access Memory).

Programs stored in the storage 9 may include applications executed in a foreground or a background and control programs for assisting operations of the applications. For example, the display 2A may display the screen for the application executed in the foreground. The control program may include, for example, an OS. The applications and the control programs may be installed in the storage 9 through wireless communication by the communication module 6 or through a non-transitory storage medium.

The storage 9 may store, for example, a control program 9A, a phone call application 9B, a mail application 9C, a calendar application 9D, a memo pad application 9E, a camera application 9F, and setting data 9Z.

The control program 9A can provide some functions related to various controls for operating the smartphone 1. The control program 9A can provide a function for displaying the screen in a regular size and in a reduced size. The control program 9A may be configured to display the screen in a reduced size. The control program 9A can provide a function for reducing the screen according to an operation detected through the touch screen display 2. The control program 9A may be configured to reduce the screen according to an operation detected through the touch screen display 2. The control program 9A may provide a function for invalidating an operation performed on an first area in the screen displayed in the display 2A. The screen includes the first area. The control program 9A may be configured to invalidate an operation performed on the first area. The control program 9A may provide a function for guiding an operation for executing a process associated with an icon when detecting a contact to the icon. The control program 9A may be configured to execute the process according to a guided operation. The control program 9A may provide a function for displaying an assist icon for executing a predetermined action when detecting an operation performed on a specific area on the screen displayed in the display 2A through the touch screen display 2.

Additionally, the control program 9A may provide a function for implementing communication, by controlling the communication module 6 or the like, using LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System), etc., provide a function for implementing short-distance wireless communication using IEEE 802.11, Bluetooth (registered trademark), IrDA (Infrared Data Association), NFC (Near Field Communication), and WPAN (Wireless Personal Area Network), etc., and provide a function for making a phone call by controlling the communication module 6 and the microphone 8, etc.

The function provided by the control program 9A may be used, when a phone call is made, in combination with a function provided by other program stored in the storage 9, such as the phone call application 9B or the mail application 9C. The function provided by the control program 9A may be divided into a plurality of program modules or may be combined with other program.

The phone call application 9B may provide a phone call function for phone calls through wireless communication. The mail application 9C may provide an electronic mail function for composition, transmission, reception, display, and the like of electronic mails. The calendar application 9D may provide a calendar function for schedule management and the like. The memo pad application 9E may provide a text editor function for creation and management of text data. The camera application 9F may provide a function for, for example, capturing, editing, and managing images and moving images. The applications stored in the storage 9 are only examples. In addition to the applications illustrated in FIG. 1, a browser application, a navigate application, a music player application, a moving image reproduction application, a calculator application, a tag application, and the like may be stored therein.

The setting data 9Z may include information on various settings and processing related to the operations of the smartphone 1. Included in the setting data 9Z is, for example, information related to a correlation between the assist icon and a predetermined action to be executed according to an operation to the assist icon.

The controller 10 may be a processing unit. Examples of the processing unit include, but are not limited to, a CPU (Central Processing Unit), an SoC (System-on-a-chip), an MCU (Micro Control Unit), and an FPGA (Field-Programmable Gate Array). The controller 10 can integrally control the operations of the smartphone 1 to implement various functions.

Specifically, the controller 10 can execute instructions included in some programs stored in the storage 9 while referring to data stored in the storage 9 as necessary. The controller 10 then can control function modules according to the data and the instructions to thereby implement the various functions. Examples of the function modules include, but are not limited to, the display 2A, the communication module 6, the microphone 8, and the speaker 11. The controller 10 can change the control according to a detection result of a detector. Examples of the detector include, but are not limited to, the touch screen 2B, the button 3, the illumination sensor 4, the proximity sensor 5, the microphone 8, the camera 12, and the attitude detecting module 15.

The controller 10 can execute the control program 9A to thereby implement the processing for displaying the screen displayed in the display 2A in a reduced size according to the operation detected through the touch screen display 2. The controller 10 can cause the display 2A to display the screen in a regular size. The controller 10 can reduce the screen according to the operation. The controller 10 can cause the display 2A to display the screen in the reduced size. The controller 10 may execute the control program 9A to thereby implement the processing for invalidating an operation performed on a first area in the reduced screen displayed in the display 2A. The controller 10 may invalidate an operation performed on the first area in the reduced screen. The controller 10 may execute the control program 9A to thereby implement the processing for displaying the assist icon for executing a predetermined action or a predetermined function in the display 2A when detecting an operation performed on a specific area on the screen displayed in the display 2A through the touch screen display 2. The controller 10 may cause the display 2A to display the assist icon.

The controller 10 may execute the predetermined action or the predetermined function according to operation onto the assist icon.

The speaker 11 may be a sound output module. The speaker 11 can receive a sound signal transmitted from the controller 10, and output the sound signal as a sound. The speaker 11 may be used to output, for example, a ring tone and music. Either one of the receiver 7 and the speaker 11 may have the other function.

The camera 12 can convert a photographed image to an electric signal. The camera 12 may include, for example, an in-camera for photographing an object facing the display 2A and an out-camera for photographing an object facing the opposite side of the display 2A.

The attitude detecting module 15 can detect an attitude of the smartphone 1. The attitude detecting module 15 may include at least one of an acceleration sensor, a direction sensor, and a gyroscope in order to detect the attitude.

The vibrator 18 can vibrate part or whole of the smartphone 1. The vibrator 18 may include, for example, a piezoelectric element or an eccentric motor in order to generate vibration. The vibration generated by the vibrator 18 may be used to inform the user of various events such as incoming calls.

The functional configuration of the smartphone 1 illustrated in FIG. 1 is an example, and it may be arbitrarily modified within a scope that does not depart from the gist of the disclosure.

Figure 2:
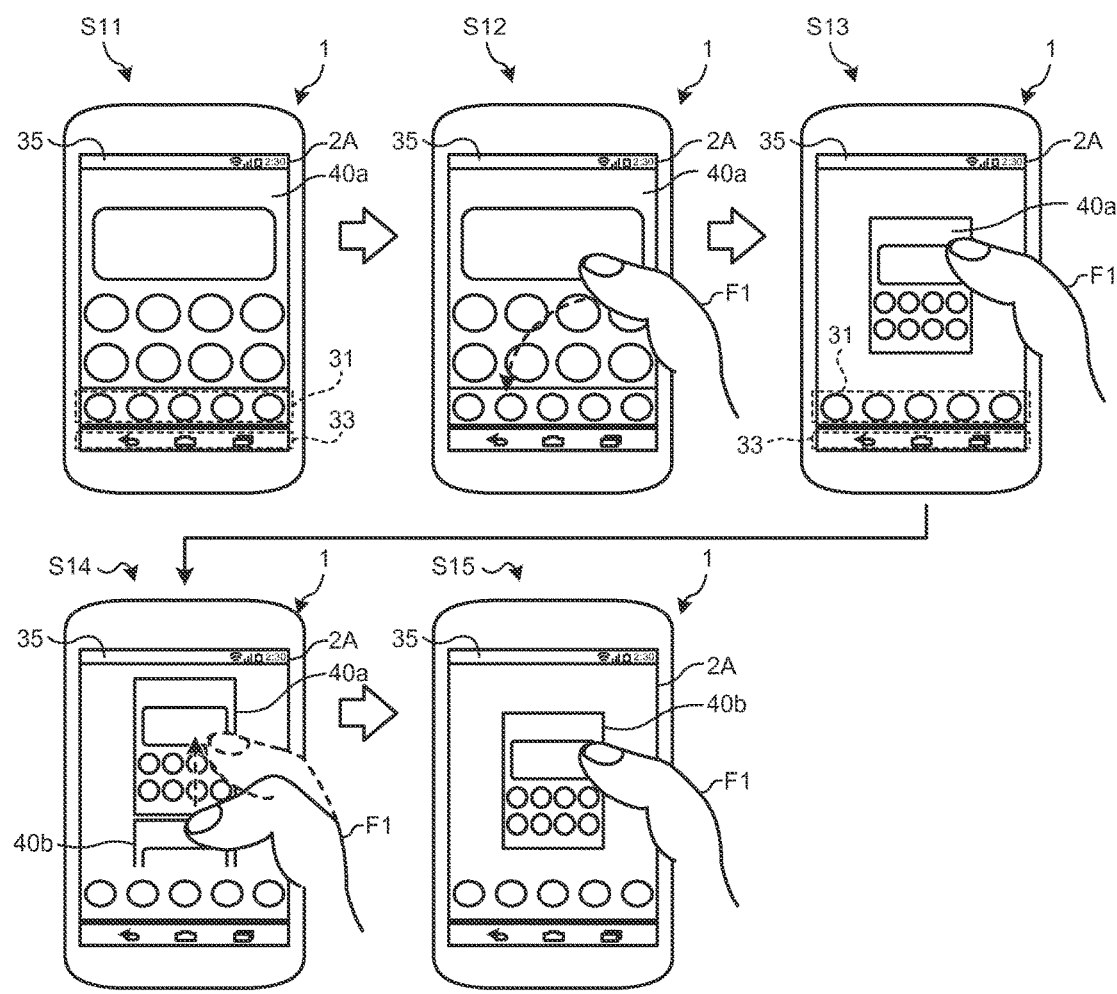
FIG. 2 is a screen diagram of one of examples.

An example of the control performed by the smartphone 1 will be explained below with reference to FIG. 2 to FIG. 6. Reference sign F1 displayed in FIG. 2 to FIG. 5 indicates the thumb of a user's right hand. As illustrated in FIG. 2, an example of the control when a so-called home screen is displayed in the display 2A is explained, but the same control can be applied also when the application screen displayed during running of the application is displayed in the display 2A.

FIG. 2 is a diagram of an example of control when the home screen displayed in the display 2A is displayed in a reduced size.

As illustrated in FIG. 2, the smartphone 1 can display a home screen 40a in the display 2A (Step S11). Displayed in the display 2A may be, in addition to the home screen 40a, a so-called quick access area 31, a navigation bar 33, and a status bar 35. Arranged in the quick access area 31 may be icons of applications that the user wants to readily access through the home screen 40a. Arranged in the navigation bar 33 may be a button for executing menu display, a button for executing a predetermined action to the running application, and the like. The status bar 35 may use a numeral, a symbol, an image, a mark, and the like to notify the user of information. The information notified by the status bar 35 may include a remaining mark indicating a remaining amount of a power supply, a radio-wave level mark indicating an electric field strength of radio wave for communication, time, weather, an application running, a type of communication system, a condition of wireless connection, a status of a phone call, a mode of the device, an event occurring in the device, and the like.

In some embodiments, a vertical direction of the display area provided in the display 2A may be determined based on a vertical direction of a character or a vertical direction an image displayed in the display 2A. Therefore, when a long-side direction of the smartphone 1 illustrated in FIG. 2 may be set as a reference, in the display area that the display 2A has, the side where the status bar 35 is displayed is an upper area of the display area, and the side where the quick access area 31 and the navigation bar 33 are displayed is a lower area of the display area. The quick access area 31 and the navigation bar 33 may be displayed in the lower area of the display area in the display 2A.

Subsequently, when detecting an operation of the thumb F1 such that a counterclockwise arc is drawn across the home screen 40a displayed in the display 2A through the touch screen 2B (Step S12), the smartphone 1 displays the home screen 40a displayed in the display 2A in the reduced size (Step S13). When detecting an operation for displaying the home screen 40a in the reduced size, the smartphone 1 invalidates an operation performed on the lower area of the display area where the quick access area 31 and the navigation bar 33 are displayed, in the display area of the display 2A.

When detecting an operation of the thumb F1 that moves over the home screen 40a displayed in the reduced size in a direction in which the status bar 35 is displayed (Step S14), the smartphone 1 displays another home screen 40b on the display 2A (Step S15).

As illustrated in FIG. 2, the smartphone 1 displays the home screen 40a in the reduced size according to the operation of the thumb F1 detected through the touch screen 2B, thus improving the operability at the time of operating the home screen 40a by using only the thumb F1 of the right hand. Accordingly, the smartphone 1 can improve the user's convenience in the case of single-handed operation.

As illustrated in FIG. 2, when detecting the operation of displaying the home screen 40a in the reduced size, the smartphone 1 may invalidate the operation performed on the lower area of the display area where the quick access area 31 and the navigation bar 33 are displayed. This enables the smartphone 1 to prevent an erroneous operation due to a contact of any portion other than the thumb F1 of the right hand to the quick access area 31 and the navigation bar 33. Accordingly, the smartphone 1 can improve the user's convenience in the case of single-handed operation.

When no operation is detected for a certain period of time after the home screen 40a is displayed in the reduced size, the smartphone 1 determines the case as time-out, and may release the reduced display of the home screen 40a and display it in its original size. When detecting an operation performed on any area other than the home screen 40a displayed in the reduced size, in the display area of the display 2A, the smartphone 1 determines the operation as a release operation of the reduced display, and may release the reduced display of the home screen 40a and display it in its original size. The smartphone 1 may release the invalidation of the operation performed on the lower area of the display area where the quick access area 31 and the navigation bar 33 are displayed, in association with the release of the reduced display of the home screen 40a.

Figure 3:
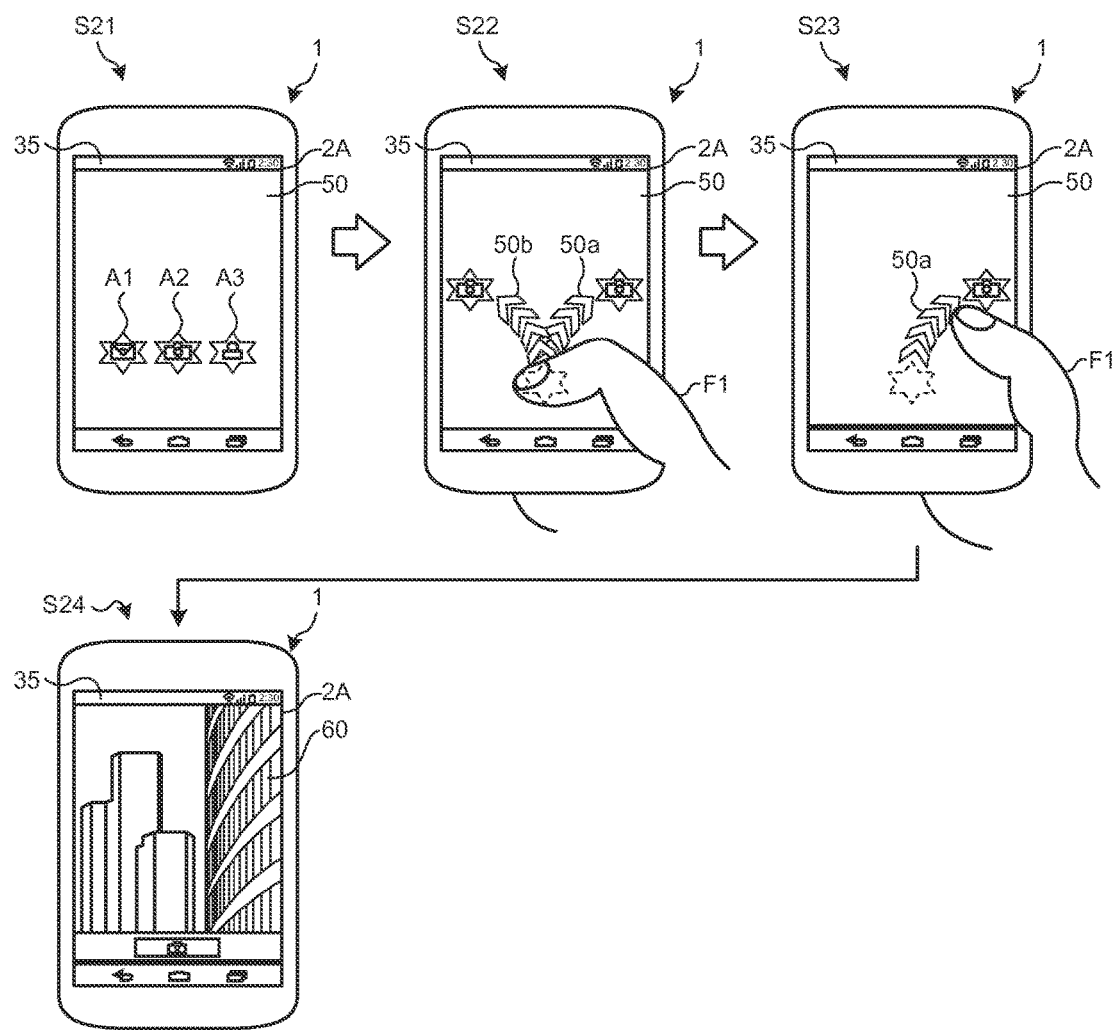
FIG. 3 is a screen diagram of one of examples.

FIG. 3 is a diagram of an example of control when an operation guide for executing processing associated with an icon on the screen displayed in the display 2A is displayed. An example of control when the so-called lock screen is displayed in the display 2A will be explained with reference to FIG. 3.

As illustrated in FIG. 3, the smartphone 1 displays a lock screen 50 in the display 2A (Step S21). Icons A1 to A3 are displayed in the lock screen 50. Activation processing of the mail application 9C is associated with the icon A1. Activation processing of the camera application 9F is associated with the icon A2. Lock release processing is associated with the icon A3. The lock screen 50 is displayed when the smartphone 1 is in a locked state. When the lock screen 50 is displayed in the display 2A, the smartphone 1 does not receive a user operation except a specific operation. The specific operation includes, for example, an operation for releasing the locked state and an operation for executing the processing associated with each of the icons A1 to A3 displayed in the lock screen 50. The locked state may include not only the state of not receiving the user operation but also a security lock state.

Subsequently, when detecting a contact of the thumb F1 to the icon A2 through the touch screen 2B, the smartphone 1 displays an operation guide 50a and an operation guide 50b (step S22). The operation guide 50a and the operation guide 50b guide an operation for activating an application. The operation guide 50a and the operation guide 50b spread from a start point. The start point is a position where the icon A2 is displayed. At this time, the smartphone 1 deletes the display of the icon A1 and the icon A3. The smartphone 1 may display the operation guide 50a and the operation guide 50b while the thumb F1 is in contact to the icon A2, and delete the operation guide 50a and the operation guide 50b when the thumb F1 separates from the icon A2. Alternatively, the smartphone 1 may display the operation guide 50a and the operation guide 50b during a time when a certain period of time elapses even if the thumb F1 separates from the icon A2.

Subsequently, when detecting an operation of moving the thumb F1 from the start point of the operation guide 50a along the operation guide 50a through the touch screen 2B (Step S23), the smartphone 1 deletes the display of the other operation guide 50b. When detecting an operation of moving the thumb F1 to an end point of the operation guide 50a along the operation guide 50a (Step S23), the smartphone 1 activates the camera application 9F and displays a screen 60 of the camera application 9F in the display 2A (Step S24).

At Step S22, the smartphone 1 does not have to delete the display of the icon A1 and the icon A3. At Step S23, the smartphone 1 does not have to delete the display of the other operation guide 50b.

Figure 4:
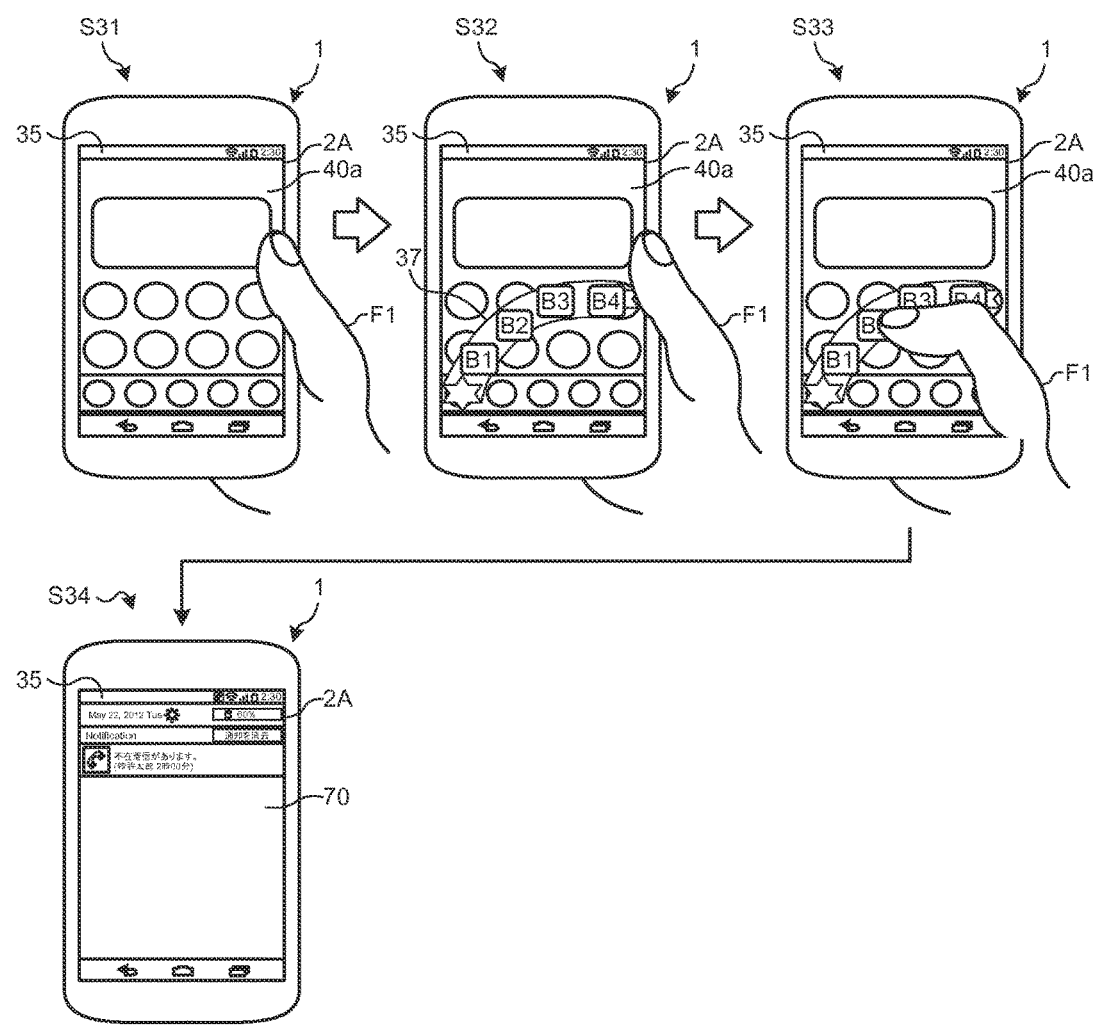
FIG. 4 is a screen diagram of one of examples.

FIG. 4 is a diagram of an example of control when an assist icon for causing the display 2A to execute a predetermined action is displayed. An example of the control when the so-called home screen is displayed in the display 2A will be explained below with reference to FIG. 4.

As illustrated in FIG. 4, when detecting a contact to a specific area of the display 2A (Step S31), the smartphone 1 displays an image 37, such that a shooting star is falling, and four assist icons B1 to B4 arranged along the image 37 in the display 2A (Step S32). The specific area of the display 2A corresponds to an area on the same side as the side where time and the like are displayed in the status bar 35 and being at a central portion when the smartphone 1 is operated, for example, with one hand using the thumb F1 of the right hand. On the other hand, when the smartphone 1 is operated with one hand using the thumb of the left hand, the specific area corresponds to an area on the opposite side to the side where time and the like are displayed in the status bar 35 and being at a central portion thereof. The smartphone 1 may display only the assist icons B1 to B4 without displaying the image 37.

Figures 5, 6:
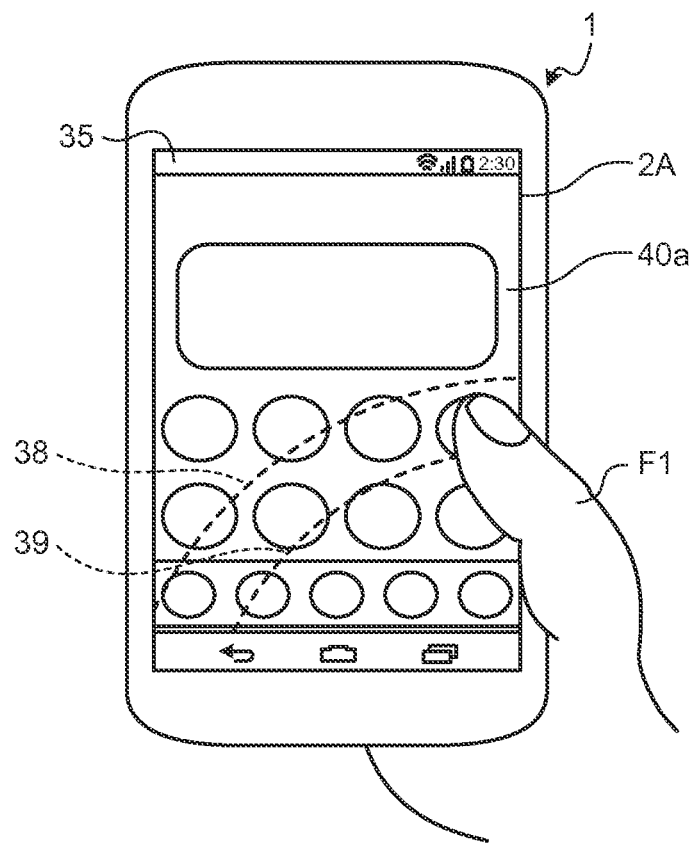
FIG. 5 is a screen diagram of one of examples.
FIG. 6 is a table diagram of one of examples.

Minimum conditions required for positions on the display 2A where the assist icons B1 to B4 are displayed are such that, for example, when the smartphone is operated by being held in the right hand, the positions are inside a display area of the display 2A on the side of the thumb F1 of the right hand from a maximum arc that can be drawn counterclockwise on the display 2A by the thumb F1 of the right hand. FIG. 5 is a diagram of an example of an arc capable of being drawn by the thumb F1 of the right hand when the smartphone is operated by being held in the right hand. As illustrated in FIG. 5, when the user operates the smartphone 1 by holding it in the right hand, the smartphone 1 previously measures a maximum arc 38 and a minimum arc 39 capable of being drawn by the thumb F1 of the right hand. The smartphone 1 determines the display positions of the assist icons B1 to B4 within the display area of the display 2A sandwiched between the maximum arc 38 and the minimum arc 39. It is most preferable that the smartphone 1 determines the display positions of the assist icons B1 to B4 within an area sandwiched between the maximum arc 38 and the minimum arc 39 and along an arc of which distances from the maximum arc 38 and the minimum arc 39 are even.

The assist icons B1 to B4 are previously associated with respective predetermined actions. Information related to a correlation between the assist icons B1 to B4 and the predetermined actions or functions executed according to each operation performed on the assist icons B1 to B4 is included in the setting data 9Z. FIG. 6 is a diagram of an example of a correlation between the assist icons B1 to B4 and the predetermined actions executed corresponding to each operation performed on the assist icons B1 to B4. As illustrated in FIG. 6, an action of memory release is associated with the assist icon B1. An action of displaying a notification screen is associated with the assist icon B2. The notification screen is a screen including a notification area to notify the user of detailed information of information for an application executed in the background to be notified to the status bar 35. An action of returning to previous one (going back to the beginning) is associated with the assist icon B3. The "return to previous one" means that during running of the application, the step is returned to the previous state before an input command is executed. An action of menu display is associated with the assist icon B4. The menu display is a display of a list of general operation items such as various settings for the smartphone 1 and a search of various data stored in the storage 9.

Subsequently, when detecting an operation performed on the assist icon 2B through the touch screen 2B (Step S33), the smartphone 1 displays a notification screen 70 on the display 2A as the action associated with the assist icon 2B (Step S34).

For example, when the operation for displaying the notification screen is associated with a swipe from an upper end of the display 2A where the status bar 35 is displayed to a lower end thereof, it is difficult for the user to display the notification screen on the display 2A by the operation using only the thumb F1 of the right hand. Therefore, the actions difficult to be executed by the operation using only the thumb F1 of the right hand are previously associated with the assist icons B1 to B4. Then as illustrated in FIG. 4, the smartphone 1 displays the assist icons B1 to B4 at positions where operations are easily performed by the thumb F1. This enables the user to easily display the notification screen even by an operation using only the thumb F1 of the right hand. In this way, the smartphone 1 allows improvement of the user's convenience in the case of single-handed operation.

In an example illustrated in FIG. 4, the smartphone 1 determines time-out when no operation is detected for a certain period of time after the display of the assist icons B1 to B4, and may delete the image screen 37 and the assist icons B1 to B4 from the home screen 40a.

In an example illustrated in FIG. 4, when detecting an operation performed on a specific area of the home screen 40a, the smartphone 1 may invalidate the operation performed on the lower area of the display area where the quick access area 31 and the navigation bar 33 are displayed. In this case, it is difficult for the user to operate menu display buttons arranged in the navigation bar 33 using only the thumb F1 of the right hand. Therefore, the smartphone 1 associates the menu display with the assist icons. As illustrated in FIG. 4, in the smartphone 1, the assist icons are displayed at the positions where the operation using the thumb F1 is easily performed. The user can thereby easily perform the menu display even with the operation using only the thumb F1 of the right hand. In this way, the smartphone 1 allows improvement of the user's convenience in the case of single-handed operation.

The conditions of invalidating the operation performed on the lower area of the display area where the quick access area 31 and the navigation bar 33 are displayed are not limited to the case where the operation for displaying the home screen 40a in the reduced size is detected and to the case where the operation performed on a specific area of the home screen 40a is detected. For example, during running of an application, the operation performed on the lower area of the display area where the quick access area 31 and the navigation bar 33 are displayed may be invalidated according to the detection of an operation performed on a specific area of the display 2A.

Figure 8:
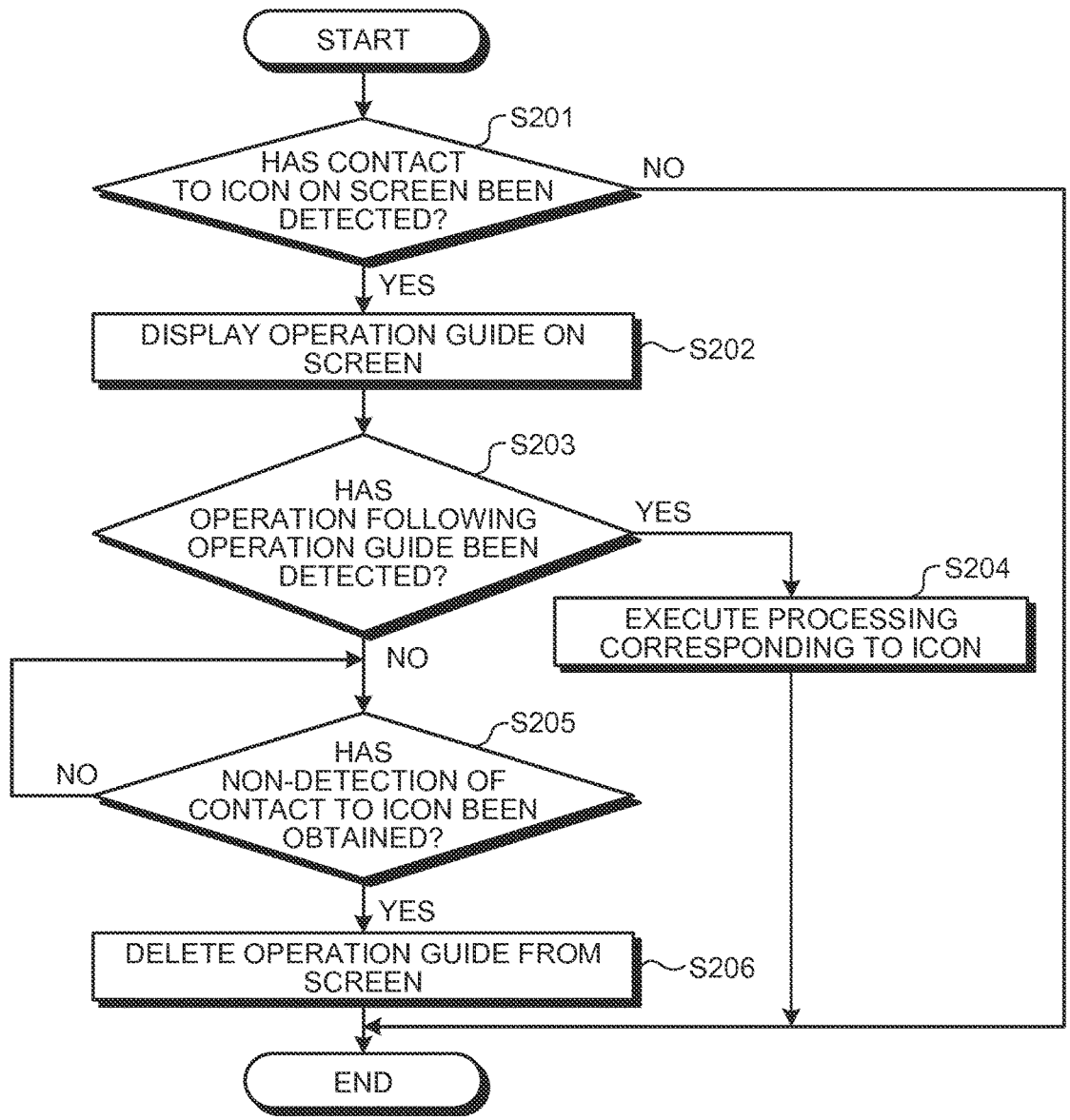
FIG. 8 is a flowchart of one of examples.
Figure 9:
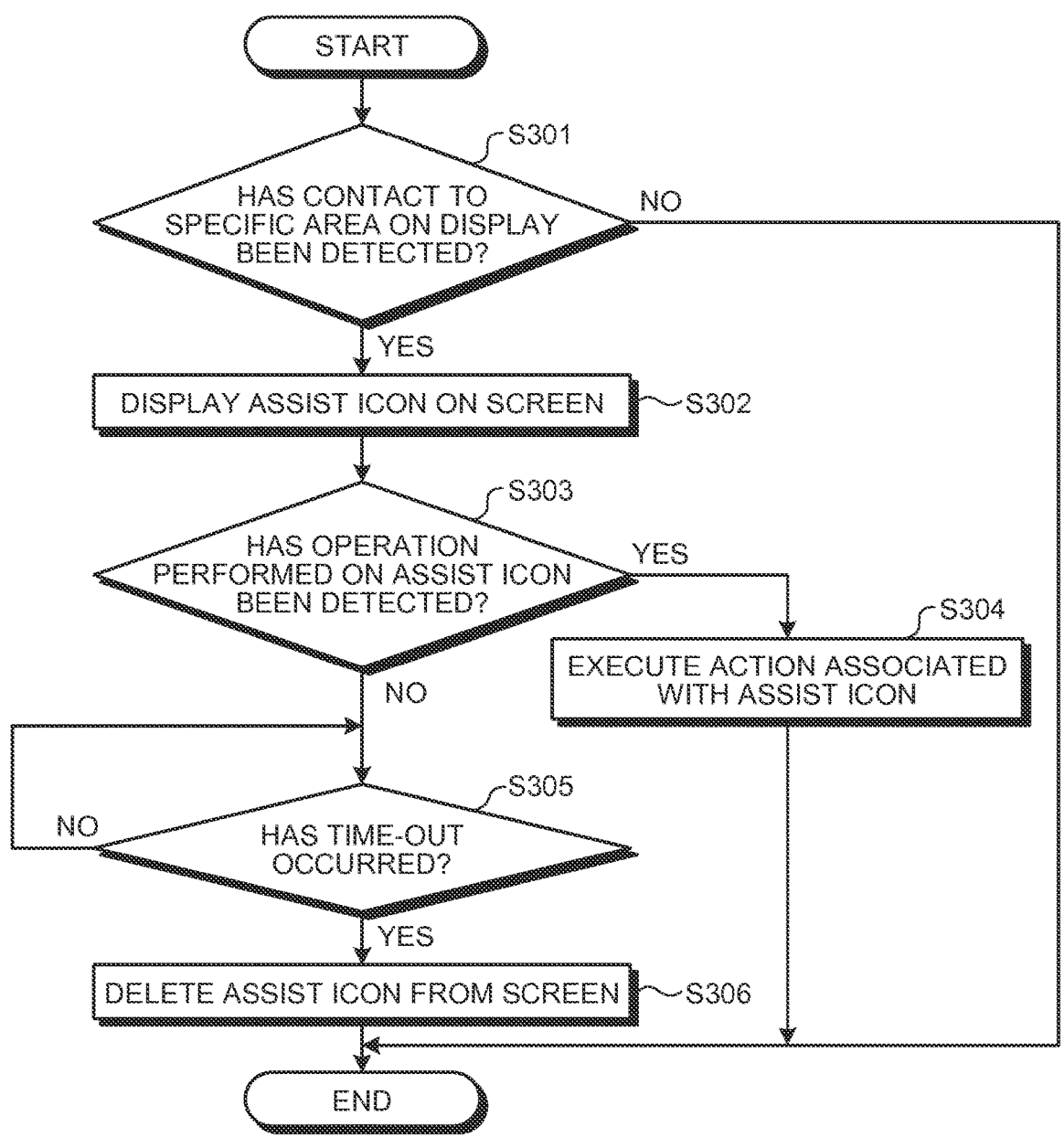
FIG. 9 is a flowchart of one of examples.

An example of a processing procedure performed by the smartphone 1 will be explained below with reference to FIG. 7 to FIG. 9. The processing procedure illustrated in FIG. 7 to FIG. 9 is implemented by the controller 10 executing the control program 9A or the like stored in the storage 9.

Figure 7:
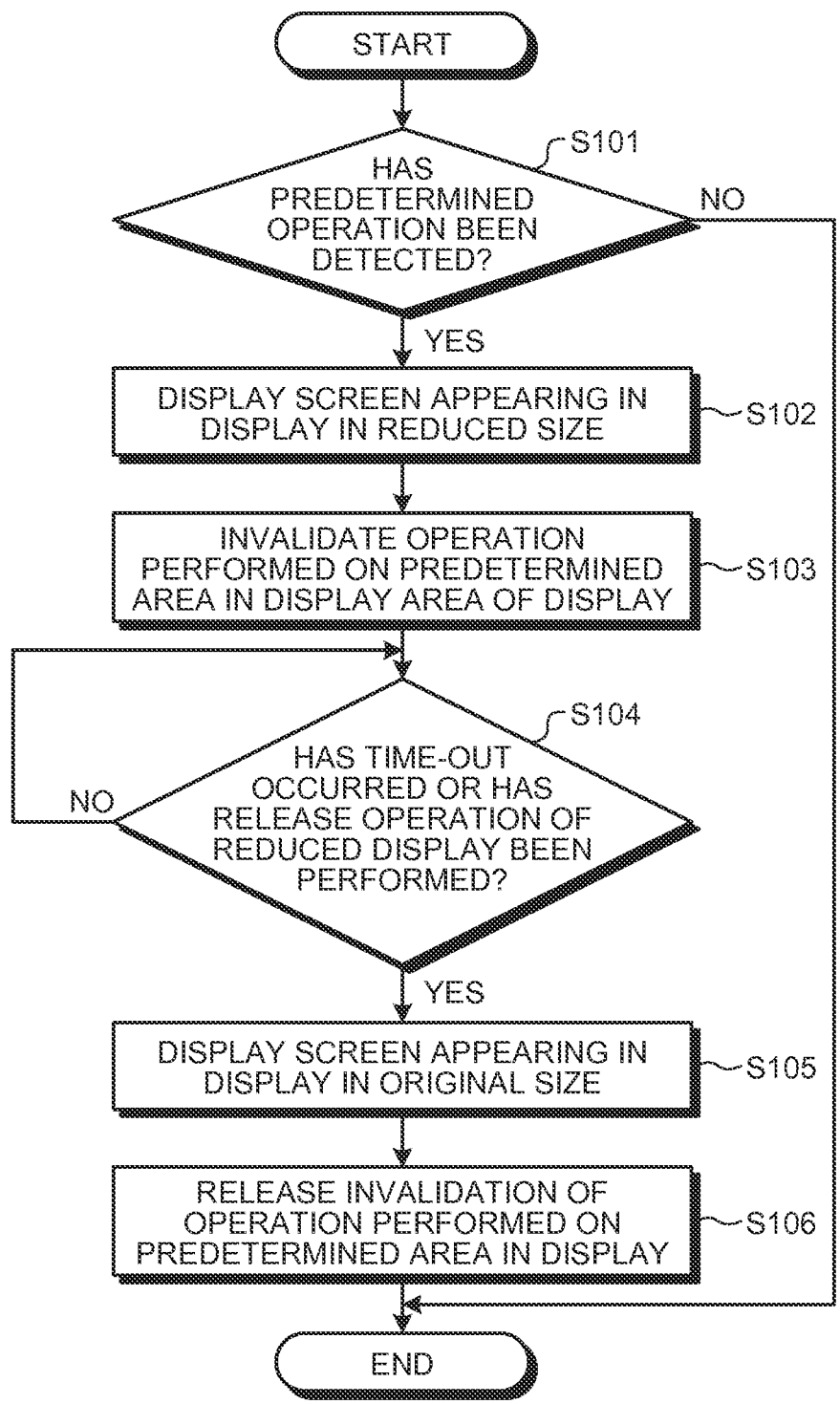
FIG. 7 is a flowchart of one of examples.

FIG. 7 is a flowchart of a processing procedure when the screen displayed in the display 2A is displayed in a reduced size.

As illustrated in FIG. 7, the controller 10 determines whether a predetermined operation has been detected through the touch screen 2B (Step S101). When it is determined that a predetermined operation has not been detected (No at Step S101), the controller 10 ends the processing procedure illustrated in FIG. 7.

Meanwhile, when it is determined that a predetermined operation has been detected (Yes at Step S101), the controller 10 displays the screen displayed in the display 2A in the reduced size (Step S102). The screen displayed in the display 2A includes the home screen 40a.

Subsequently, the controller 10 invalidates the operation performed on the predetermined area in the display area of the display 2A (Step S103). The controller 10 invalidates the operation performed on the so-called quick access area 31 and the navigation bar 33 (see FIG. 2, etc.)

The controller 10 then determines whether the time-out has occurred or the release operation of the reduced display has been performed (Step S104). The controller 10 determines time-out when no operation is detected for a certain period of time after the display of the screen in the reduced size at Step S102. When detecting an operation performed on any area other than the screen displayed in the reduced size in the display area of the display 2A, the controller 10 determines that it is the release operation of the reduced display.

When it is determined that the time-out has not occurred or the release operation of the reduced display has not been performed (No at Step S104), the controller 10 repeatedly performs the determination of Step S104.

Meanwhile, when it is determined that the time-out has occurred or the release operation of the reduced display has been performed (Yes at Step S104), the controller 10 displays the screen displayed in the display 2A in the original size (Step S105).

Subsequently, the controller 10 releases the invalidation of the operation performed on the predetermined area of the display 2A (Step S106), and ends the processing procedure illustrated in FIG. 7.

FIG. 8 is a flowchart of a processing procedure when the operation guide is displayed on the screen displayed in the display 2A.

As illustrated in FIG. 8, the controller 10 determines whether a contact to an icon on the screen displayed in the display 2A has been detected through the touch screen 2B (Step S201). When it is determined that a contact to an icon on the screen has not been detected (No at Step S201), the controller 10 ends the processing procedure illustrated in FIG. 8.

Meanwhile, when it is determined that a contact to an icon on the screen has been detected (Yes at Step S201), the controller 10 displays the operation guide (see FIG. 3) on the screen (Step S202).

Subsequently, the controller 10 determines whether an operation following the operation guide has been detected through the touch screen 2B (Step S203).

When it is determined that an operation following the operation guide has been detected (Yes at Step S203), the controller 10 executes the processing associated with the icon where the contact is detected at Step S201 (Step S204), and ends the processing procedure illustrated in FIG. 8.

Meanwhile, when it is determined that an operation following the operation guide has not been detected (No at Step S203), the controller 10 determines whether a contact to the icon on the screen is no longer detected (non-detection has been obtained) (Step S205).

When it is determined that a contact to the icon on the screen has been detected (No at Step S205), the controller 10 repeatedly performs the determination of Step S205.

Meanwhile, when it is determined that a contact to the icon on the screen is no longer detected (Yes at Step S205), the controller 10 deletes the operation guide from the screen (Step S206), and ends the processing procedure illustrated in FIG. 8.

FIG. 9 is a flowchart of a processing procedure when the assist icon is displayed on the screen displayed in the display 2A.

As illustrated in FIG. 9, the controller 10 determines whether a contact to a specific area of the display 2A has been detected through the touch screen 2B (Step S301). The specific area of the display 2A corresponds to an area on the same side as the side where time and the like are displayed in the status bar 35 and being at a central portion when the smartphone 1 is operated, for example, with one hand using the thumb F1 of the right hand. When it is determined that a contact to a specific area has not been detected (No at Step S301), the controller 10 ends the processing procedure illustrated in FIG. 9.

Meanwhile, when it is determined that a contact to a specific area has been detected (Yes at Step S301), the controller 10 displays an assist icon (see FIG. 4) on the screen displayed in the display 2A (Step S302).

Subsequently, the controller 10 determines whether an operation performed on the assist icon has been detected through the touch screen 2B (Step S303).

When it is determined that an operation performed on the assist icon has been detected (Yes at Step S303), the controller 10 executes the action associated with the assist icon (Step S304), and ends the processing procedure illustrated in FIG. 9.

Meanwhile, when it is determined that an operation performed on the assist icon has not been detected (No at Step S303), the controller 10 determines whether the time-out has occurred (Step S305). The controller 10 determines that the time-out has occurred when no operation is detected for a certain period of time after the display of the assist icon.

When it is determined that the time-out has not occurred (No at Step S305), the controller 10 repeatedly performs the determination of Step S305.

Meanwhile, when it is determined that the time-out has occurred (Yes at Step S305), the controller 10 deletes the assist icon from the screen (Step S306), and ends the processing procedure illustrated in FIG. 9.

Figure 10:
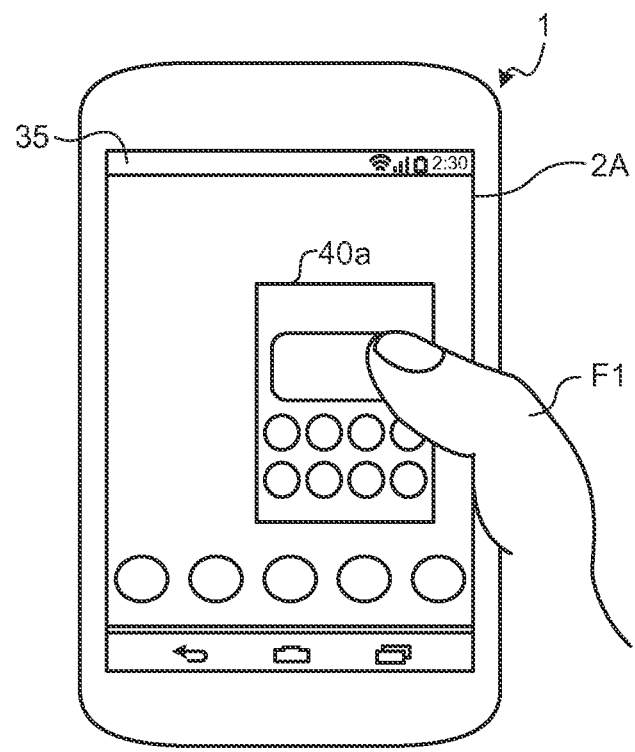
FIG. 10 is a diagram of one of display examples.

In an example illustrated in FIG. 2, the controller 10 may move the home screen 40a displayed in the reduced size in anyone of directions in the display area of the display 2A, to be display in this location. FIG. 10 is a diagram of a display example of the reduced screen. As illustrated in FIG. 10, when the user operates the smartphone 1 with the right hand, the controller 10 may move the reduced home screen 40a in a lower right direction, to be displayed in this location. The side where the status bar 35 is displayed is set as an upper side, and the side where the time and the like are displayed in the status bar 35 is set as a right side. For example, the controller 10 determines whether an operation is right-handed operation or left-handed operation based on the operation for displaying the home screen 40a in the reduced size (e.g., Step S12 in FIG. 2), moves the reduced home screen 40a to the lower right side to be displayed if it is the right-handed operation, and moves the reduced home screen 40a to the lower left side to be displayed if it is the left-handed operation. The controller 10 determines that the operation is the right-handed operation if it draws an arc counterclockwise, and determines that the operation is the left-handed operation if it draws an arc clockwise.

In an example illustrated in FIG. 4, when the application is running, it may be configured that the controller 10 displays an assist icon associated with an action, a function, or processing, etc. for supporting the operation of the application running. For example, when the mail application 9C is running, the controller 10 displays an assist icon associated with an action related to execution of the mail application 9C such as composition, transmission, draft, or the like of a mail.

When the application, used by inclining a longitudinal direction of the smartphone 1 to horizontal, is running, the controller 10 may determine an upper direction of a character, graphics, a symbol, and an image in the application screen displayed in the display 2A and a direction in which a reduced application screen is moved based on the determination result of the attitude detecting module 15 or the like. For example, the controller 10 refers to information for a previously registered dominant hand of the user to move the reduced application screen to the dominant hand side and displays it in this location based on the determination result of the attitude detecting module 15 or the like.

Some embodiments have been described in order to completely and clearly disclose the technology according to the appended claims. However, the appended claims should not be limited to above embodiments, and should be embodied by a replaceable configuration and all the modifications that can be created by persons skilled in the art of the technological field within the scope of basic matters indicated in the present specification.

Each of the programs illustrated in FIG. 1 may be divided into a plurality of modules. Alternatively, each of the programs illustrated in FIG. 1 may be integrated with other program.

In some embodiments, the smartphone has been explained as an example of the device with a touch screen; however, the device according to the appended claims is not limited to the smartphone. The device according to the appended claims may be any electronic device other than the smartphone. The electronic device is, for example, a mobile phone, a tablet, a mobile personal computer, a digital camera, a media player, an electronic book reader, a navigator, and a gaming device. Alternatively, the device according to the appended claims may be a stationary-type electronic device. The stationary-type electronic device is, for example, a desktop personal computer and a television receiver.

REFERENCE SIGNS LIST

1 SMARTPHONE
2 TOUCH SCREEN DISPLAY
2A DISPLAY
2B TOUCH SCREEN
3 BUTTON
4 ILLUMINATION SENSOR
5 PROXIMITY SENSOR
6 COMMUNICATION MODULE
7 RECEIVER
8 MICROPHONE
9 STORAGE
9A CONTROL PROGRAM
9B PHONE CALL APPLICATION
9C MAIL APPLICATION
9D CALENDAR APPLICATION
9E MEMO PAD APPLICATION
9F CAMERA APPLICATION
9Z SETTING DATA
10 CONTROLLER
11 SPEAKER
12 CAMERA
15 ATTITUDE DETECTING MODULE
18 VIBRATOR

The invention claimed is:

1. An electronic device, comprising:
a touch screen display including a first area and a second area, and configured to detect an operation of a user; and
a controller configured to
cause the touch screen display to display a screen in the first area,
cause the touch screen display to reduce a size of the screen and decrease a magnification of a content in the first area according to a first operation detected through the touch screen display and to display the screen in a reduced size,
execute a predetermined function according to a second operation performed on the second area, when the size of the screen in the first area is not reduced, and
not to execute the predetermined function even if the second operation performed on the second area is detected through the touch screen display, when the size of the screen in the first area is reduced,
wherein
the controller is configured to
cause the touch screen display to display, in the screen in the first area, an element and an operation guide for executing a process associated with the element, and
execute the process when the touch screen display detects a third operation according to the operation guide.

2. The electronic device according to claim 1, wherein the touch screen display is configured to display a plurality of elements in the screen.

3. A control method of controlling an electronic device with a touch screen display that includes a first area and a second area and is configured to detect an operation of a user, the control method comprising:
causing the touch screen display to display a screen in the first area;
detecting a first operation through the touch screen display;
causing the touch screen display to display the screen in a reduced size and decrease a magnification of a content in the first area according to the detected first operation;
executing a predetermined function according to a second operation performed on the second area, when the size of the screen in the first area is not reduced; and
not executing the predetermined function even if the second operation performed on the second area is detected through the touch screen display, when the size of the screen in the first is reduced,
wherein
the touch screen display is caused to display, in the screen in the first area, an element and an operation guide for executing a process associated with the element, and
the process is executed when the touch screen display detects a third operation according to the operation guide.

4. A non-transitory storage medium that stores a control program for causing, when executed by an electronic device with a touch screen display that includes a first area and a second area and is configured to detect an operation of a user, the electric device to execute:
causing the touch screen display to display a screen in the first area;
detecting a first operation through the touch screen display;
causing the touch screen display to display the screen in a reduced size and decrease a magnification of a content in the first area according to the detected first operation;
executing a predetermined function according to a second operation performed on the second area, when the size of the screen in the first area is not reduced; and
not executing the predetermined function even if the second operation performed on the second area is detected through the touch screen display, when the size of the screen in the first is reduced,
wherein
the touch screen display is caused to display, in the screen in the first area, an element and an operation guide for executing a process associated with the element, and
the process is executed when the touch screen display detects a third operation according to the operation guide.

* * * * *